United States Patent

Tanaka et al.

[11] Patent Number: 5,555,480
[45] Date of Patent: Sep. 10, 1996

[54] LENS HOLDING STRUCTURE

[75] Inventors: Hitoshi Tanaka; Norio Sato, both of Tokyo, Japan

[73] Assignee: Asahi Kogaku Kogyo Kabushiki Kaisha, Tokyo, Japan

[21] Appl. No.: 274,039

[22] Filed: Jul. 12, 1994

[30] Foreign Application Priority Data

Jul. 12, 1993 [JP] Japan .................................. 5-043163 U

[51] Int. Cl.$^6$ ....................................................... G02B 7/02
[52] U.S. Cl. ........................ 359/822; 359/811; 359/820
[58] Field of Search ................................. 359/811, 820, 359/822, 823, 699, 826, 830, 703, 819, 825, 827, 814, 824

[56] References Cited

U.S. PATENT DOCUMENTS

| | | | |
|---|---|---|---|
| 3,205,774 | 9/1965 | Estes | 359/820 |
| 3,671,108 | 6/1972 | Kilgus | 359/820 |
| 3,915,560 | 10/1975 | Levine et al. | 359/824 |
| 4,634,221 | 1/1987 | Höpfner | 359/824 |
| 4,720,167 | 1/1988 | Okura | 359/819 |
| 4,759,618 | 7/1988 | Kamata | 359/703 |
| 4,834,514 | 5/1989 | Atsuta et al. | 359/699 |
| 4,974,949 | 12/1990 | Tanaka . | |
| 5,177,641 | 1/1993 | Kobayashi et al. | 359/820 |
| 5,245,476 | 9/1993 | Shono | 359/699 |
| 5,268,794 | 12/1993 | Chan | 359/699 |
| 5,285,322 | 2/1994 | Horning et al. | 359/826 |
| 5,381,272 | 1/1995 | Kato et al. | 359/823 |
| 5,406,417 | 4/1995 | Denvenyi | 359/823 |

FOREIGN PATENT DOCUMENTS

| | | | |
|---|---|---|---|
| 58-43407 | 3/1983 | Japan | 359/820 |
| 2-201302 | 8/1990 | Japan . | |

Primary Examiner—Loha Ben
Attorney, Agent, or Firm—Greenblum & Bernstein P.L.C.

[57] ABSTRACT

In a camera lens group having both glass and plastic lenses mounted in a lens frame, where at least one of the lenses is movable along the optical axis, a spacing member and a resiliently deformable member are each arranged in an interval between lenses in the lens group. The resiliently deformable member biases one of the lenses away from the spacing member, and the spacing member reduces the range of possible movement of the movable lens.

29 Claims, 3 Drawing Sheets

LENS HOLDING STRUCTURE

BACKGROUND OF THE INVENTION

The present invention relates to a lens holding structure for modern compact cameras, wherein synthetic resin lenses are sometimes used in combination with glass lenses for their low weight and ease of manufacture.

However, synthetic resin differs markedly from glass in several mechanical properties, notably in hardness, mechanical stiffness, and coefficient of thermal expansion. If both materials are used in the same lens barrel, a lens holding structure must compensate for these differences so that there is no optical distortion.

There is known in the art a lens holding arrangement wherein a conical spring washer is disposed between a first lens and a second lens (U.S. Pat. No. 5,177,641), to allow for thermal expansion of the synthetic resin second lens. In the disclosed arrangement, the first lens is fixed and the second lens is movable in the direction of the optical axis. The conical spring washer provides a bias to separate the lenses, and the first and second lenses are thus maintained with a predetermined spacing. The conical spring washer acts to absorb shock in the direction of the optical axis.

However, if the described annular spring supports a plurality of lenses including at least one synthetic resin lens, then if the lenses in the group undergo shock, the deformation of the annular spring then increases because of the larger mass of a multi-lens group. The deformation of the spring may exceed the elastic limit of the spring. In a worst case situation, the resiliency of the annular spring may be weakened or lost when subjected to repeated shock.

Especially in a lens barrel, the width (in the radial direction) of the annular spring is constrained by the spatial limits of a lens barrel. The spring constant of the annular spring is constrained in the range where the spring will not cause distortion of the plastic lens under normal temperature variations. Given these limits, when the interval between the lenses is relatively large, the range of springs actually employable in a lens barrel is restricted to springs having a low elastic limit, and which may be permanently deformed under full compression.

Accordingly, when the interval between lenses is relatively large, the annular spring may be compressed in excess of its elastic limit and the lenses may be shifted by a large amount under shock load.

SUMMARY OF THE INVENTION

It is therefore an object of the present invention to provide an improved lens holding structure that satisfies the need for a structure capable of both (1) allowing movement of a lens within a lens group and (2) restricting the range of movement of the lens, so that a resilient member used to allow the movement of the lens will not be permanently deformed under shock loads, and so that the movement of the lens is controlled within a range that will not result in lens damage.

The improved lens holding structure, holds a first and second lens where the first lens is fixed and the second lens is movable along the optical axis: Included in the structure is a resilient member and an adjusting ring arranged between the two lenses or between a lens and a limiting surface along the sequence of lenses in the group.

According to the invention, a lens holding structure contains a lens frame accommodating a first lens and a second lens having an interval therebetween. The second lens is movable within predetermined range along an optical axis. A resiliently deformable member associated with the second lens biases the second lens along the optical axis in a predetermined direction; an adjusting portion is provided for enabling the maximum amount of movement of the second lens within the predetermined range.

According to another aspect of the invention, a lens holding structure is provided in which a lens frame accommodating a first lens and a second lens having an interval therebetween. The second lens is movable within a predetermined range along an optical axis. A resiliently deformable member, associated with the movable lens biases the movable lens along the optical axis in a predetermined direction. A further aspect of the invention restricts an amount of compression of the resilient member.

DESCRIPTION OF THE ACCOMPANYING DRAWINGS

DESCRIPTION OF THE EMBODIMENT

With reference to the drawings, embodiments of the present invention are described herein.

Figure 1:
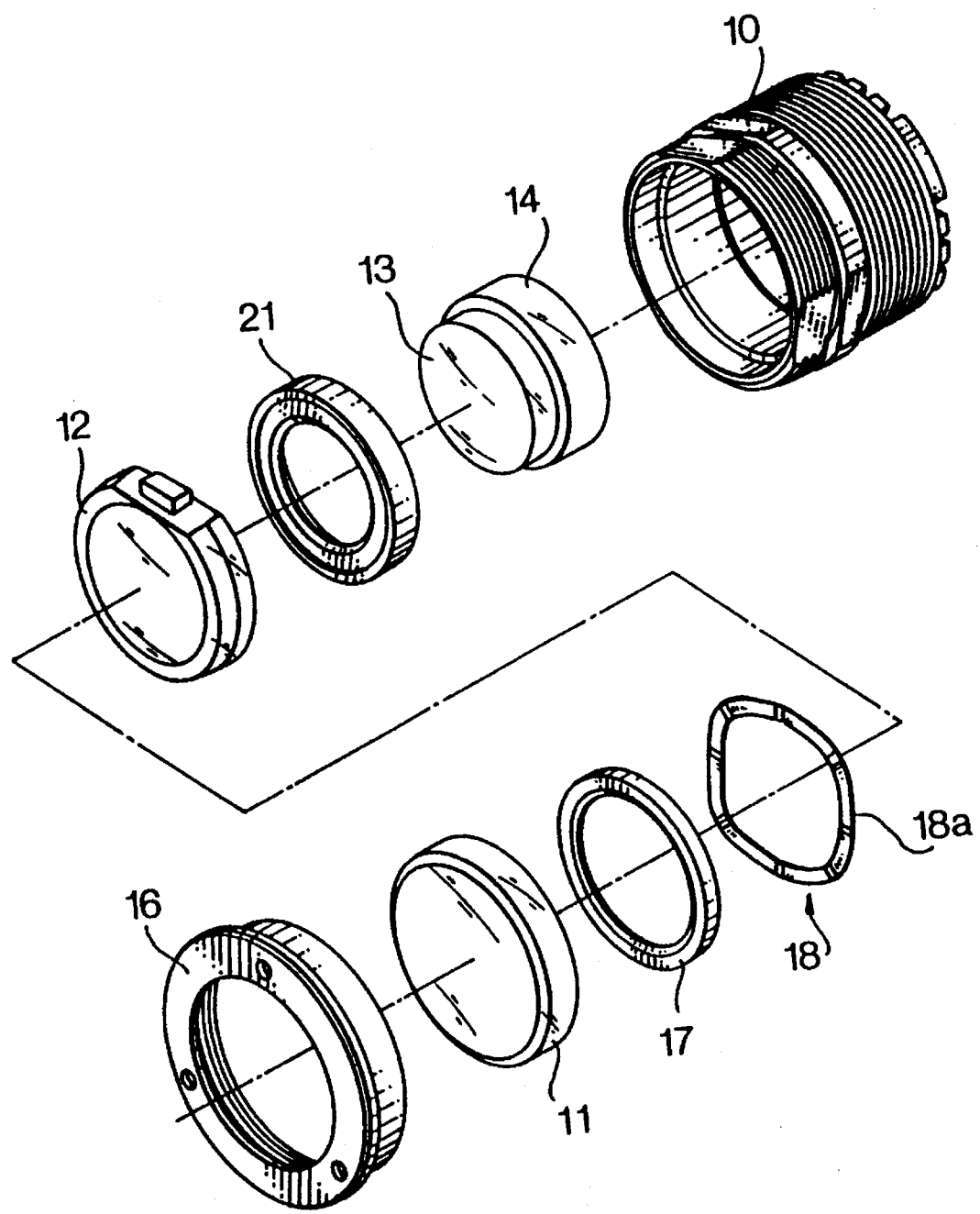
FIG. 1 is an exploded perspective view of a lens frame, lenses, and related components embodying the invention.

A cylindrical lens frame 10, shown in FIG. 1, is mounted in a lens barrel (not shown), and is movable along the optical axis. The lens frame 10 houses a first lens 11, a second lens 12, a third lens 13, and a fourth lens 14. The second lens 12 is synthetic resin, and the other lenses are glass.

Figure 2:
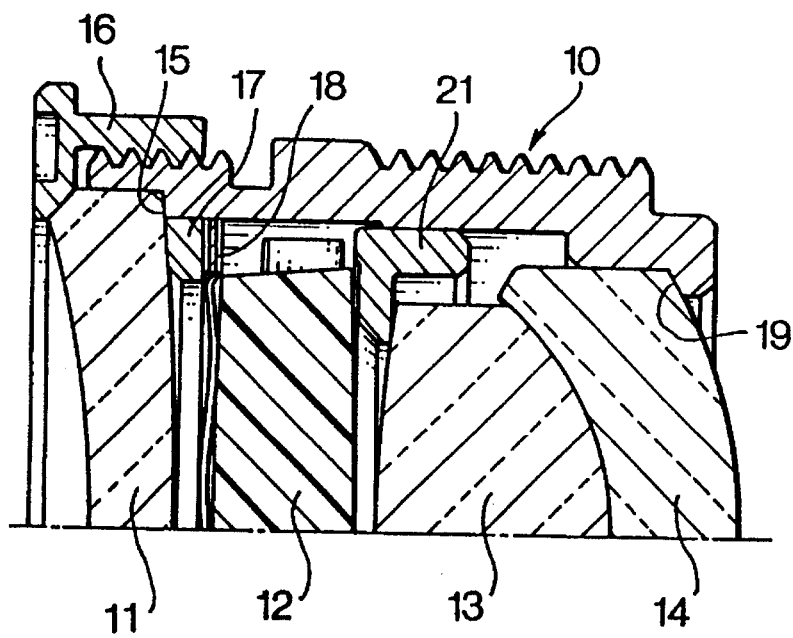
FIG. 2 is a sectional view showing a first lens holding structure embodying the invention.

According to the first embodiment, shown in FIG. 2, the frontmost first lens 11 is held between a front stepped portion 15, formed at the front of the lens frame 10, and an annular stopper 16 mounted by peripheral screws (not shown) to the front end of the lens frame 10. On the rear side of the first lens 11, an adjusting ring 17 is inserted and an annular resilient member 18 is arranged behind the adjusting ring 17. The second lens 12 is positioned to the rear of the annular resilient member 18. The third and fourth lenses 13 and 14 are joined by adhesive, and the fourth lens 14 engages the rear stepped portion 19 formed on the rear portion of the lens frame 10. Arranged between the second lens 12 and the third lens 13 is a static spacer ring 21. The spacer ring 21 has an L-shaped cross section, and its inner flat portion is held between the second and third lenses 12 and 13, so as to passively maintain a predetermined interval between the second and third lenses 12 and 13.

The first lens 11 is fixed, and is not movable in the direction of the optical axis. The second, third and fourth lenses 12, 13, and 14 are movable along the optical axis within the range of deformation of the annular resilient member 18. The ring-shaped resilient member 18 biases the lenses 12, 13, and 14 away from the first lens 11, and the fourth lens 14 normally engages the rear stepped portion 19. However, the lenses 12, 13 and 14 may move in the direction of the optical axis, compressing the annular resilient member 18, when a shock load is applied in the direction of the optical axis. Additionally, the free surface of the second lens 12, the frontal surface, may move towards the front of the lens group under thermal expansion and compress the annular resilient member 18.

The adjusting ring 17 is made of a hard material such as metal, and the outer diameter is substantially the same as the annular resilient member 18. However, the inner diameter of the adjusting ring 17 is slightly smaller than that of the annular resilient member 18. The adjusting ring 17 is arranged between the annular resilient member 18 and the first lens 11, and engages the outer periphery of the first lens 11. The annular resilient member 18 engages the outer peripheral portion of the second lens 12.

Figures 3A, 3B:
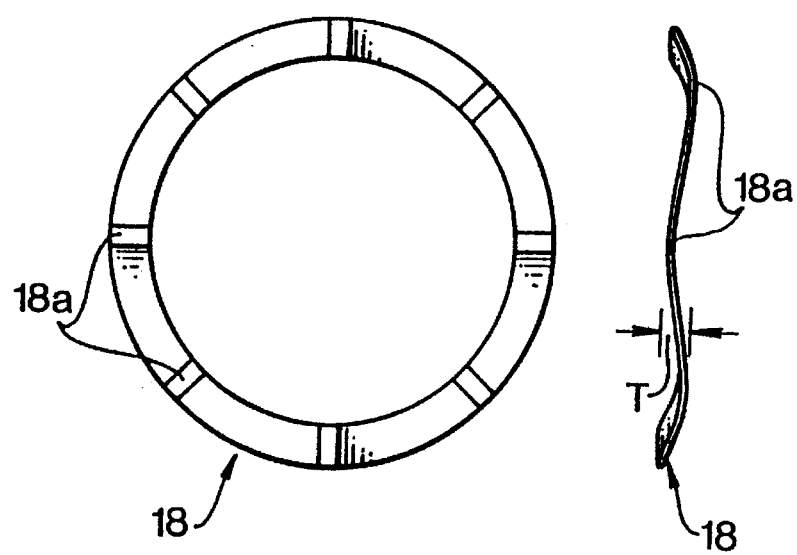
FIG. 3(a) and 3(b) are a plan and side view, respectively, of a ring-shaped resilient member.

FIGS. 3(a) and 3(b) show front and side views of an annular resilient member 18. As shown, the annular resilient member 18 has bent portions 18a at 45 degree intervals around the circumference of the resilient member. Each bent portion 18a is bent in a loose V shape, and the adjacent bent portions 18a are bent in the opposite direction to each other. That is, the annular resilient member 18 is a wave washer. The annular resilient member may be any annular resilient member of similar function, such as a rubber O-ring, or a concave spring washer.

According to the first described embodiment, at least one adjusting ring 17, made of a hard material, is arranged between the first lens 11 and the annular resilient member 18. The thickness of the adjusting ring 17 may be set at more than half of the interval between the first and second lenses 11 and 12. Thus, the displacement along the optical axis of the lenses 12, 13, and 14 under shock load is much less than the interval between the first and second lenses 11 and 12. At most, the displacement under shock load may be the undeformed thickness T of annular resilient member 18. The deformation of the annular resilient member 18 is therefore limited to be considerably less than the prior art and the resilient member 18 will not be permanently deformed or compressed beyond its elastic limit. The position of the annular resilient member may be changed to be between the first lens 11 and the adjusting ring 17.

Furthermore, the inner diameter of the adjusting ring 17 is set to be less than that of the annular resilient member 18, and light dispersion causing flaring by the annular resilient member 18 is therefore prevented.

Figure 4:
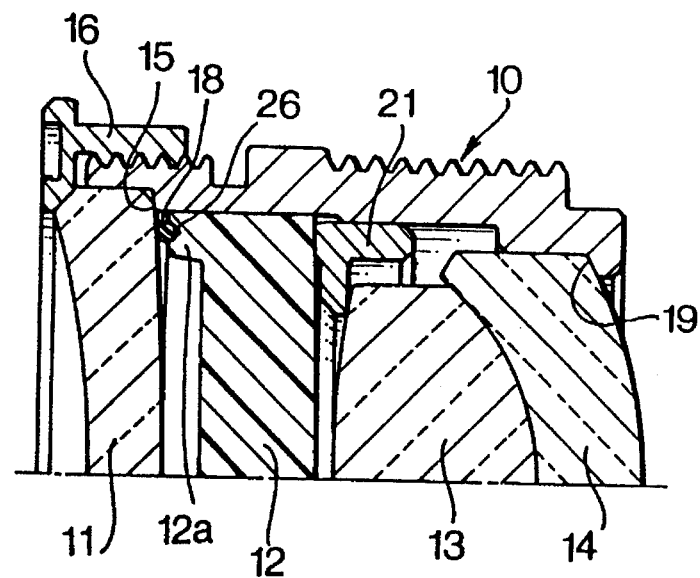
FIG. 4 is a sectional view showing a second embodiment of the present invention.

A second embodiment is shown in FIG. 4. In the second disclosed embodiment, the second lens 12 is constructed in such a manner that an adjusting portion 12a protrudes from the frontal surface of the second lens 12. The adjusting portion 12a may be a ring-shaped portion or a set of protrusions evenly spaced around the perimeter of the frontal surface of the second lens 12. The adjusting portion 12a may protrude by a length more than one half of the interval between first lens 11 and second lens 12. In FIG. 4, an annular resilient member 18 is arranged between first lens 11 and the adjusting portion 12a of the second lens 12. In the embodiment of FIG. 4, the annular resilient member is an O-ring, which is secured in a V-groove 26 formed in a ring-shaped adjusting portion 12a. The adjusting portion 12a may be coated with an opaque coating, or provided with a light blocking member, to block light and reduce flare from the adjusting portion region. The free surface of the second lens 12 is the front surface.

Figure 5:
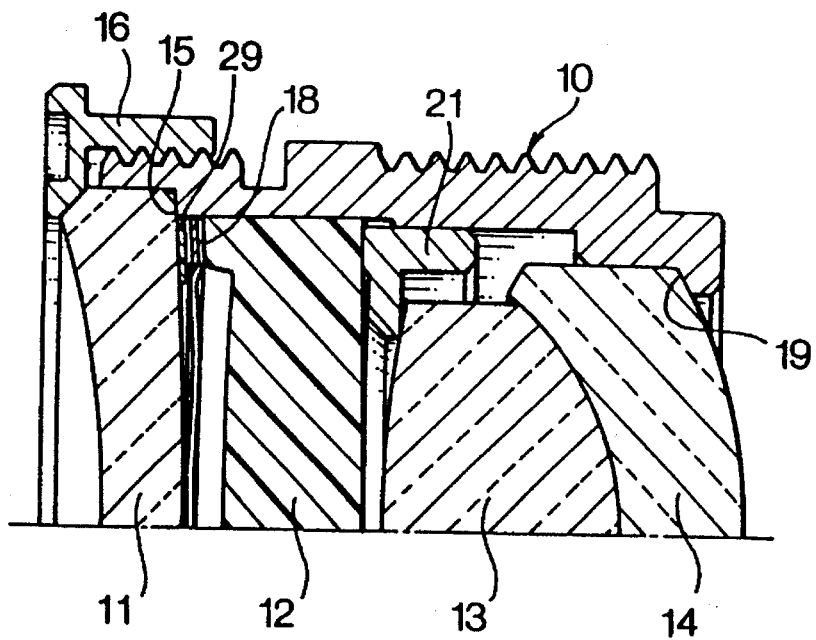
FIG. 5 is a sectional view showing a third embodiment of the present invention.

In a third embodiment shown in FIG. 5, the second lens 12 is constructed in such a manner that an adjusting portion 12a protrudes from the frontal surface of the second lens 12. The adjusting portion 12a may be a ring-shaped portion or a set of protrusions evenly spaced around the perimeter of the frontal surface of the second lens 12. The adjusting portion 12a may protrude by a length more than one half of the interval between first lens 11 and second lens 12. In this embodiment, the annular resilient member 18 is a wave washer. An annular opaque member 29 is arranged between the annular resilient member 18 and the first lens 11. The opaque member 29 is only intended to block light, and the thickness of the opaque member 29, shown in FIG. 5, is exaggerated for clarity. The opaque member 29 may be designed without sharp edges to minimize edge diffraction. The free surface of the second lens 12 is the front surface.

The lens holding structures of the embodiments therefore accomplish the object of limiting the displacement of the second lens 12 and associated lenses 13, 14, such that the annular resilient member 18 may not be compressed beyond their elastic limit, and the movement of the lenses in the lens group is restricted to a small amount.

The present disclosure relates to a subject matter contained in Japanese Utility Model Application No. HEI 5-43163, filed on Jul. 12, 1993, which is expressly incorporated herein in its entirety.

What is claimed is:

1. A lens holding structure, comprising:
    a lens frame that accommodates a first lens and a second lens, said first lens and said second lens having a space therebetween;
    a static spacing member having a predetermined thickness along a direction of an optical axis of said first lens and said second lens; and
    a resiliently deformable member that biases said first lens and said second lens away from each other along said optical axis,
    said spacing member and said resiliently deformable member being positioned adjacent to each other and between said first lens and said second lens along said direction of said optical axis,
    said spacing member, located between said resiliently deformable member and one of said first lens and said second lens, reducing a deflection amount of said resiliently deformable member.

2. The lens holding structure according to claim 1, wherein
    said predetermined thickness is more than one half of said space between said first and second lenses.

3. A lens holding structure according to claim 1, wherein said resiliently deformable member is annular in shape.

4. A lens holding structure according to claim 3, wherein said resiliently deformable member comprises a wave washer.

5. A lens holding structure according to claim 3, wherein said resiliently deformable member comprises an O-ring, made of an elastic material.

6. A lens holding structure according to claim 1, wherein said spacing member comprises an integrally formed protrusion protruded from one of said first lens and said second lens towards the other of said first lens and said second lens.

7. A lens holding structure according to claim 6, wherein said integrally formed protrusion is annular in shape.

8. A lens holding structure according to claim 6, wherein said integrally formed protrusion protrudes by more than one half of said space between said first lens and said second lens.

9. A lens holding structure according to claim 1, wherein at least said second lens comprises a lens made of a synthetic resin having a coefficient of thermal expansion higher than that of said resiliently deformable member.

10. A lens holding structure according to claim 1, wherein said spacing member is opaque, and acts to selectively block light from entering either one of said first lens and said second lens.

11. A lens holding structure according to claim 1, wherein said lens frame comprises a limiting surface for limiting movement of one of said first lens and said second lens in a direction away from said spacing member, a side of said one of said first lens and said second lens, opposite said limiting surface, being expandable into said space between said first lens and said second lens.

12. A lens holding structure according to claim 11, wherein a remaining one of said first lens and said second lens is fixed in said lens frame in said direction of said optical axis.

13. A lens holding structure according to claim 1, wherein said spacing member and said resiliently deformable member are each distributed, with respect to a functional optical path of said first lens and said second lens, so that said spacing member and said resiliently deformable member are outside of said functional optical path of said first lens and said second lens.

14. The lens holding structure according to claim 1, said spacing member further reducing a range of movement of one of said first and second lenses.

15. The lens holding structure of claim 1, wherein said spacing member contacts one of said first lens and said second lens.

16. A lens holding structure, comprising:

a lens frame that accommodates a first lens and a second lens, said first lens and said second lens having a space therebetween, wherein at least said second lens comprises a movable lens that is movable within a predetermined axis;

a resiliently deformable member positioned proximate said movable lens to bias said movable lens along said optical axis in a predetermined direction; and means for passively restricting an amount of compression of said resiliently deformable member.

17. The lens holding structure according to claim 16, said resiliently deformable member and said restricting means positioned between said first and second lenses.

18. The lens holding structure of claim 16, wherein said restricting means contacts one of said first lens and said second lens.

19. A lens holding structure having at least a first lens and a second lens, in which said first lens and said second lens are mounted for movement relative to each other along an optical axis, and a resilient member that is disposed between said first lens and said second lens to bias said first lens and said second lens in opposite directions along said optical axis, wherein the improvement comprises:

a static restricting member positioned between said resilient member and one of said first lens and said second lens to restrict a relative movement of said first lens and said second lens along said optical axis and to reduce a deflection amount of said resilient member.

20. The lens holding structure according to claim 19, said restricting member further preventing permanent deformation of said resilient member and preventing shock damage to the first and the second lenses.

21. The lens holding structure according to claim 19, said resilient member and said restricting member being positioned between the first and the second lenses.

22. The lens holding structure according to claim 19, said resilient member and said restricting member being positioned adjacent to each other.

23. The lens holding structure of claim 19, wherein said restricting member contacts one of said first lens and said second lens.

24. A lens holding structure, comprising:

a lens frame that accommodates a first lens and a second lens, said first lens and said second lens having a space therebetween;

a spacing member that has a predetermined thickness along a direction of an optical axis of said first lens and said second lens; and a resiliently deformable member that biases said first lens and said second lens away from each other along said optical axis, said spacing member and said resiliently deformable member being located adjacent to each other and between said first lens and said second lens along a direction of said optical axis, said spacing member being located between said resiliently deformable member and one of said first lens and said second lens to reduce a deflection amount of said resiliently deformable member, said spacing member and said resiliently deformable member being peripherally distributed with respect to a functional optical path of said first lens and said second lens.

25. The lens holding structure of claim 24, wherein said predetermined thickness is greater than one-half of said space between said first lens and said second lens.

26. The lens holding structure of claim 24, wherein one of said first lens and said second lens comprises a resin type lens.

27. The lens holding structure of claim 26, wherein said resiliently deformable member compensates for different coefficients of thermal expansion of said first lens and said second lens.

28. The lens holding structure of claim 24, wherein said resiliently deformable member is ring-shaped.

29. The lens holding structure of claim 28, wherein said ring-shaped resiliently deformable member comprises a wave washer.

* * * * *

UNITED STATES PATENT AND TRADEMARK OFFICE
CERTIFICATE OF CORRECTION

PATENT NO. : 5,555,480
DATED : September 10, 1996
INVENTOR(S) : H. TANAKA et al.

It is certified that error appears in the above-indentified patent and that said Letters Patent is hereby corrected as shown below:

At column 5, line 7 (claim 11, line 3) of the printed patent, before "movement" insert ---a---.

Signed and Sealed this

Thirteenth Day of May, 1997

Attest:

BRUCE LEHMAN

Attesting Officer

Commissioner of Patents and Trademarks